April 23, 1968 R. H. CORDINGLY ET AL 3,379,171
RELEASE AGENT COATING APPARATUS
Filed Aug. 17, 1964 2 Sheets-Sheet 1
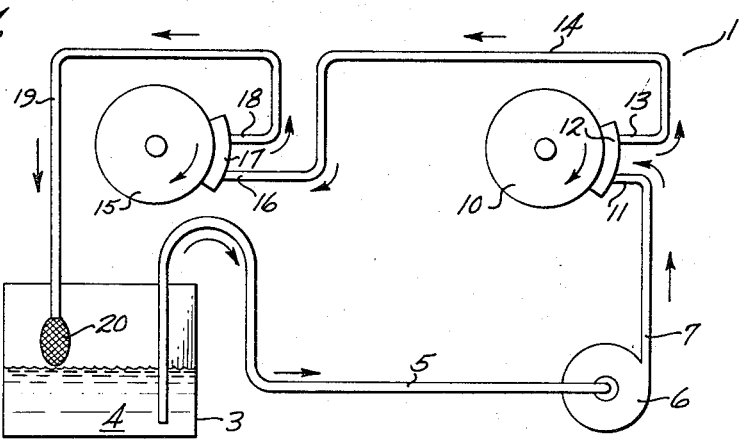
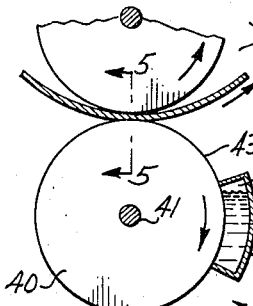
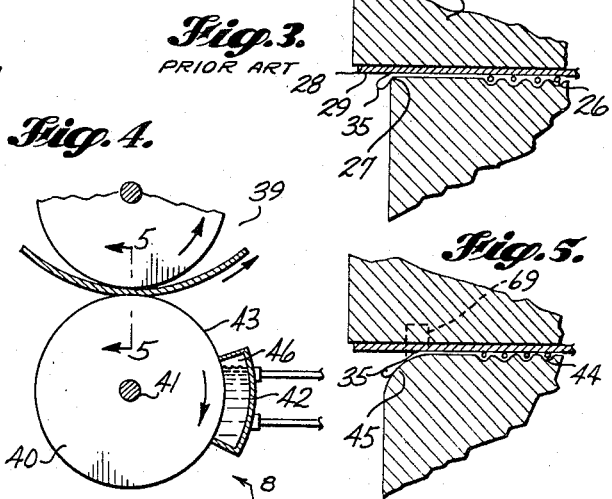
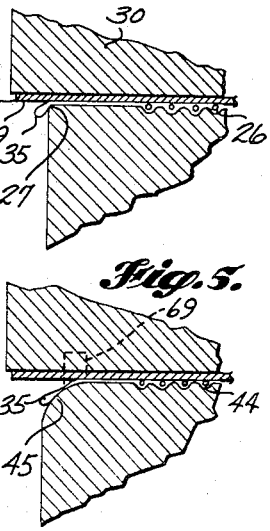
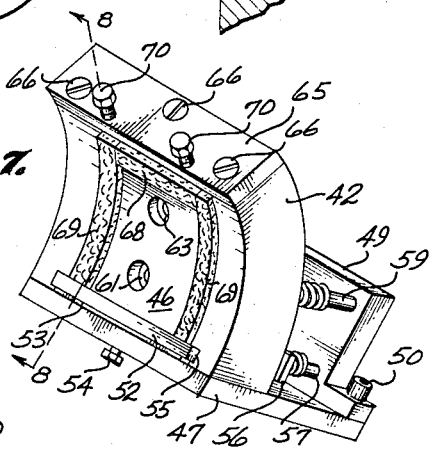
INVENTORS
RICHARD H. CORDINGLY
DALE W. QUACKENBUSH
BY
ATTORNEYS

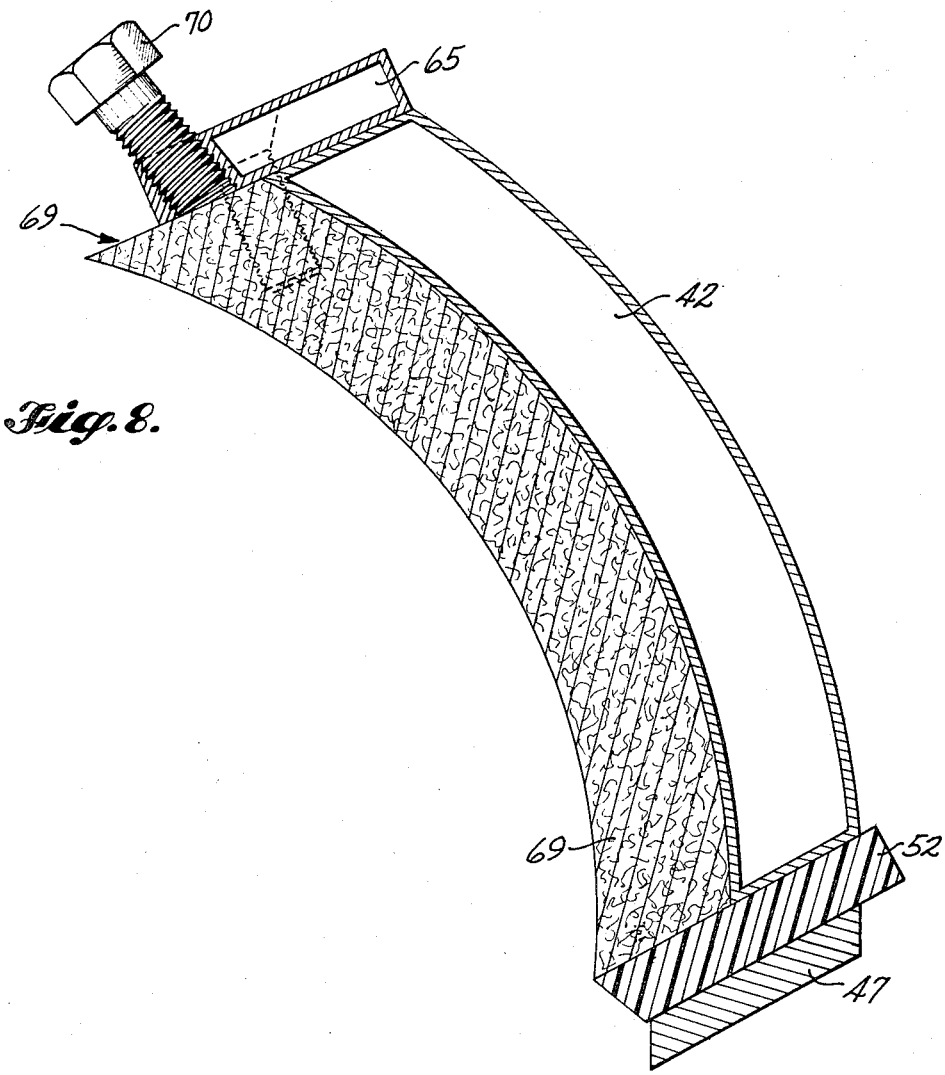

3,379,171
RELEASE AGENT COATING APPARATUS

Richard H. Cordingly and Dale W. Quackenbush, Longview, Wash., assignors to Weyerhaeuser Company, Tacoma, Wash., a corporation of Washington
Filed Aug. 17, 1964, Ser. No. 389,865
8 Claims. (Cl. 118—261)

This invention relates to an apparatus for applying liquid coating containing volatiles to sheet material with a minimum loss of volatiles. More particularly, this invention relates to an improved apparatus for applying a release agent or nonadherent to selected areas of paperboard carton stock which have been coated with a heat-sealable film.

In the manufacture of polyethylene-coated milk cartons and other thermoplastic-coated containers, where reopening of certain heat-sealed parts is necessary, a release agent or nonadherent is applied to critical areas such as the pouring lip area of milk cartons. U.S. Patent No. 3,116,002 discloses a milk carton with a sealing resistant coating applied in certain areas over a heat-sealable thermoplastic surface.

Normally the release agent used as a nonadherent contains a volatile solvent which may evaporate and cause drastic changes in the properties of release agent and even render the material ineffective. It is imperative that the release agent be printed onto the cartons in a sufficient quantity and in the proper areas. Due to loss of volatile solvents, applicator wear and inadequate sealing, release agent application has not been ideal and unsatisfactory cartons have often been produced. Either there is insufficient release agent applied causing difficulty in top opening or there is too much applied causing "top-leakers." Either extreme causes heavy losses due to excessive scrap, machine downtime, and customer dissatisfaction.

A well-known release agent applicator consists of a brass pot to hold the release agent, a rotogravure print-on roll which passes through a pond of release agent in the pot, and three doctor blades which doctor the excess nonadherent from the face and sides of the print-on roll. The blade pressure exerted against the face of the gravure wheel is adjustable to some degree from the outside of the pot, but the side blades are not adjustable from the outside. The two corners formed about the wheel face and sides by the three blades present a major problem. It is extremely difficult to prevent some of the release agent from leaking past the blades at these two points and being transferred onto the cartons in the form of a continuous line. If the width of these lines becomes excessive, the resulting cartons must be rejected since they will leak. In some cases, the lines can be minimized or eliminated by increasing the pressure of the face doctor blade against the wheel. If this maneuver is successful it is at the sacrifice of blade and wheel life. It should be noted that by increasing the blade pressure the wheel temperature increases which, in turn, reduces the pot life of the release agent. If this approach is unsuccessful, the printing press has to be shut down, the pot taken off and the side blades adjusted. Thus, ghosting problems usually result in scrap cartons and machine downtime. Since the applicator pond is poorly sealed to the atmosphere, the volatile material from the release agent is free to evaporate into the atmosphere.

It is, therefore, the object of our invention to provide an improved release agent coating apparatus which eliminates the problems resulting from the use of the prior art applicators.

It is a further object of this invention to provide a release agent coating apparatus which by its construction reduces to a minimum the solvent loss from the release agent and by so doing extends the pot life of the nonadherent used.

It is a further object of this invention to provide an improved release agent coating apparatus which includes a gravure print-on roll having rounded edges permitting some leakage from the release agent applicator pond onto the rims of the applicator roll without transferring this release agent onto the carton stock.

It is a further object of this invention to provide an improved release agent coating apparatus which includes a single adjustable doctor blade which has long life and which can be replaced with minimum machine downtime.

It is a further object of this invention to provide an improved release agent coating apparatus which forms a bath area on the gravure print-on roll face only and thereby provides an adequate supply of the release agent at the desired contact point with the print-on roll and also permits the recirculating release agent to remain in the bath a minimum period of time thereby maintaining the release agent at a lower application temperature and extending its pot life.

It is a further object of this invention to provide an improved release agent coating apparatus which has seals which can be adjusted during operation of the apparatus.

It is a still further object of this invention to provide an improved release agent coating apparatus which is trouble-free in operation, easy to maintain and inexpensive to produce.

In the practice of this invention a paper web sheet passes a release agent coating station which may be placed in a printing press. At the release agent coating station an applicator wheel is held in contact with the paper web sheet and rotates at the same surface speed as the web passes the applicator station. The applicator wheel has an etched surface in the form of the pattern of release agent which is desired to be printed upon or applied to the web sheet material. In a location on the peripheral surface of the applicator wheel a release agent bath is maintained in contact with the wheel surface by an applicator pot. The pot is provided with side and top seals and a bottom doctor blade to confine the release agent pond in a bath chamber within the seals and the blade. As the surface of the wheel rotates past the applicator pot and through the bath within the pot the etched pattern surfaces become filled with the release agent and any excess release agent which touches or adheres to the wheel surface is wiped clean by the doctor blade. Since the side seals are in engagement with the peripheral surface of the wheel and not the side edges of the wheel there are no critical corners to seal. The applicator wheel, however, can also be modified from that known in the prior applicators by rounding its shoulders. In this manner any release agent which might pass from the pot through the side seals to the edge of the wheel will not transfer to the paper web since the drops or beads of release agent formed on the edge of the wheel form on a rounded shoulder and unless a great deal of release agent does leak past, the bead formed will not be large enough to make contact with the surface of the web sheet.

Other objects and novel features of the invention will appear more fully hereinafter from the following detailed description when considered in connection with the accompanying drawings. It is understood, however, the drawings are utilized for the purpose of illustration only, and are not to be taken as a definition of the limits of the invention, reference being had for this purpose to the appended claims.

In the drawings, wherein similar reference characters refer to similar parts throughout several views:

FIGURE 1 is a schematic diagram of a typical applicator release agent coating applicator system;

FIGURE 2 is a side elevation view in section of a typical prior art release agent coating apparatus;

FIGURE 3 is a partial section view through lines 3—3 of FIGURE 2;

FIGURE 4 is a side elevation view in schematic form of the improved release agent coating apparatus according to this invention;

FIGURE 5 is a partial section view through lines 5—5 of FIGURE 4;

FIGURE 6 is a partial perspective view of the improved release agent coating apparatus;

FIGURE 7 is a partial perspective view of the improved release agent coating apparatus from a different position than that shown in FIGURE 6; and FIGURE 8 is a cross-sectional view of the improved coating apparatus as shown through lines 8—8 of FIGURE 7.

Referring now more specifically to FIGURE 1, a typical release agent coating system 1 is shown in schematic form. This system consists of a release agent storage tank 3 which contains a supply of liquid release agent 4. From the storage tank 3 there is provided a pump supply line 5 to a slow-speed, gear type pump 6. From the pump 6 through the pump outlet line 7 the release agent is conveyed to the first applicator wheel 10 which is driven in the direction of the arrow by a drive means (not shown). The release agent is conveyed through a first pot inlet 11 to the interior of the first applicator pot 12 and from the pot 12 through the first applicator pot outlet 13. If additional applicator stations are required the first pot outlet line 14 conveys the release agent to the second applicator wheel 15 which is driven in the direction of the arrows by a drive means (not shown). The release agent is conveyed to the second applicator pot inlet 16 to the interior of the second applicator pot 17 and from the second applicator pot 17 through the second applicator pot outlet 18 to the storage tank inlet line 19. In order that the release agent may be kept clean and free from material which will increase the wear on the applicator wheels or parts of the applicator apparatus, the storage tank may be provided with a release agent filter 20 which may take the form of a woman's nylon stocking. It is seen by the system shown in FIGURE 1 that the release agent 4 may be pumped through the system and maintained in a small bath on the peripheral surfaces of the applicator wheels and that any excess release agent flows through the outlet of the applicator pot to the next station in the system.

In reference now to FIGURES 2 and 3 there is shown in schematic form a typical prior art release agent applicator system 22. This system consists of a tank 23 through which passes an applicator wheel 24 which is rotated in the direction of the arrow by a drive means (not shown). The applicator wheel 24 has a peripheral surface 25 in which is etched a pattern 26 which corresponds to the desired pattern which is to be transferred to the paper web 28. The paper web 28 passes the applicator station in the direction shown by the arrow and has a web surface 29 which meets and contacts the wheel surface 25 and etch 26. The paper web 28 is backed-up and held in contact with the applicator wheel surface 25 by the web roll 30.

In order that the release agent 4 which clings to the surface 25 and the etch 26 of the applicator wheel 24 does not wipe all over the web surface 29 there is provided a doctor blade support 31 which has a top doctor blade 32 and side blades 33 for wiping the excess release agent 4 from the peripheral and side edges of the applicator wheel 24. The top blade 32 is adjustable by means of the adjusting screw 34. Since the release agent 4 does cling to the side edges of the applicator wheel 24, the doctor blades 32 and 33 have a difficult wiping function to perform. As shown in FIGURE 3 any leakage from the etched area 26 of the release agent 4 toward the side edge of the applicator wheel 24 or any build-up of the release agent on the wheel edge 27 causes the formation of a bead 35 of the release agent 4 which will transfer to the web surface 29 and thus cause poor sealing and undoubted rejection of any container formed from paper web 28.

As previously indicated the way to eliminate this formation of the edge bead 35 is to increase the pressure of the doctor blades 32 and 33 against the surfaces of the applicator wheel 24, however, it is difficult to adjust the pressure of the side edge blades 33 since it requires taking the applicator away from the applicator station to make this adjustment. Also, the adjustment of the top blade 32 by means of the adjusting screw 34 is a limited adjustment. Regardless of the lack of ease of adjusting the doctor blades, it should be noted that as the blade pressure is increased on the side and peripheral surfaces of the applicator wheel 24 the wheel will heat up and this causes increased wear on the wheel and on the doctor blades and increases the temperature of the release agent adversely affecting its pot life.

Referring now to improvement shown in FIGURES 4 and 5, in the improved system 39, the applicator wheel 40 is rotated in the direction of the arrow by drive means (not shown). The drive wheel 40 has a wheel surface 43 which comes into contact with the release agent 4 which is held in a pot 42 on the peripheral surface 43 only of the applicator wheel 40. The applicator wheel 40 is held in contact with the moving paper web 28 which passes in the direction of the arrow and is held into contact with the wheel surface 43 by the means of the web roll 30.

As seen in FIGURE 5 the edge of the applicator wheel 40 or wheel shoulder 45 may be rounded so that any release agent which passes the side seals 69 (shown in dashed lines) of the pot 42 and forms drops or edge beads 35 on the wheel shoulder 45 can build up to be very large before any contact is made with the web surface 29. It should also be noted that since the surface etched area 44 on the wheel surface 43 is the only area where the release agent is required, it is possible for the applicator pot 42 to be placed just opposite the etched area 44. Thus there is no need for having the applicator wheel 40 pass through a bath which touches the side surfaces of the wheel.

While the advantages of the rounded shoulder 45 shown in FIGURE 5 have proven this design superior to the square edge wheel 27 shown in FIGURE 3, applicator wheels with square edges operate satisfactorily with the improved applicator pot 42. The improved seal arrangement and the adjustability of the applicator pot 42 provide such improved operating efficiencies over the prior art system that the rounded shoulder applicator wheel 45 is not essential for effective operation. It should be noted, however, that a square edge wheel in contact with a moving web has a tendency to cause creasing or cutting of the web at the edges of the wheel and this tendency does not exist with rounded shoulder applicator wheels.

Referring now to FIGURE 6, the improved system 39 is shown in more detail. The applicator wheel 40 is rotated by means of a wheel axle 41 which is driven by a drive means (not shown). Applicator pot 42 is held close to the wheel surface 43 so that the surface etch 44 is in contact with a bath area in the bath chamber 46, as best shown in FIGURE 7. The applicator pot 42 is supported on an applicator base frame plate 47 and may slide on this plate 47 in a track (not shown). An adjusting screw plate 49 is secured to the base frame plate 47 by means of bolts 50.

The single doctor blade 52 is supported upon a blade adjusting pad 53 and is adjusted through pad 53 by a screw 54. The doctor blade 52 passes through a blade aperture in the body of the applicator pot 42 and is held into position by a blade plate 56 which is adjustably positioned by means of blade adjusting thumb screws 57 which are secured in the adjusting screw plate 49.

The applicator pot 42 is adjustably positioned by means of the pot adjusting thumb screws 59 also secured in the adjusting screw plate 49. To provide the release agent liquid to the pot 42, a pot inlet line 60 conveys the release agent through the pot inlet fitting 61 into the bath chamber 46. From the bath chamber 46 the overflow of the release agent passes through the outlet fitting 63 through the pot outlet line 64. The top of the applicator pot 42 is provided with a top cap plate 65 which is secured to the applicator pot 42 by means of cap bolts 66. The bath chamber 46 is surrounded and defined by the body of the applicator pot 42, the surface of the applicator wheel 43, the top seal 68, the side seals 69, and the doctor blade 52.

The doctor blade 52 may be of Teflon material since this provides good wearing resistance but does not adversely affect the wear of the applicator wheel. The pressure of the doctor blade 52 against the surface 45 of the applicator wheel 49 can be easily adjusted by means of the blade adjusting thumb screws 57.

The seals 68 and 69 may be made of felt such as is often referred to as "fisherman's felt" since it is the same type that is used on the bottom of fishing boots. Good results have been retained from felt strips slightly wider than ¼ of an inch. These strips are preconditioned by dipping in the release agent solution three or four times and allowing them to dry between each dip. This pretreatment appears to fill the felt so that it will not leak. The side felts, side seals 69, can be adjusted, as shown in FIGURE 8, by means of the adjusting bolt 70 to tighten the seal between the side seals 69 and the doctor blade 52 while the applicator is in operation.

By providing a very small bath chamber 46 in relation to the prior art bath, applicants have found that the temperature of the release agent is maintained at a minimum and that the pot life of the release agent is kept at a maximum with a minimum of solvent loss. It has also been found that since the applicator pot 42 can be easily withdrawn from contact with the surface of the applicator wheel 40, the top seals 68, the side seals 69, and the doctor blade 52 can be easily replaced in the minimum of time.

Having now described our invention and in what manner the same may be used, what we claim as new and desire to protect by Letters Patent is:

1. An apparatus for applying liquid to a wheel surface comprising in combination:
    an applicator pot means;
    side seal means secured to said pot means;
    a doctor blade positioned normal to and in contact with said side seal means;
    adjusting means supported in said pot means and engageable with one end of said side seal means to adjust the pressure of the other end of said side seal means against said doctor blade; and
    inlet means in said pot means for supplying said liquid to the chamber formed by said pot means, said side seal means, said doctor blade, and said wheel surface.

2. The apparatus of claim 1 wherein:
    said wheel surface moves relative to said pot means in a direction from said one end of said side seal means toward the ends of said side seal means in contact with said doctor blade.

3. The apparatus of claim 1 including:
    a top seal member positioned parallel to said doctor blade and in contact with the inside side surfaces of said one end of said side seal means.

4. The apparatus of claim 1 wherein:
    said doctor blade is adjustable in a direction toward and away from said wheel surface.

5. The apparatus of claim 1 wherein:
    said applicator pot means and said side seal means are adjustable in a direction toward and away from said wheel surface.

6. The apparatus of claim 1 including:
    outlet means in said pot means positioned more remote from said doctor blade than is said inlet means for permitting the overflow liquid to flow from said chamber.

7. An apparatus for applying liquid to sheet material comprising in combination:
    an applicator pot means;
    side seal means secured to said pot means;
    doctor blade positioned normal to and in contact with said side seal means;
    adjusting means supported in said pot means and engageable with one end of said side seal means to adjust the pressure of the other end of said side seal means against said doctor blade; and
    an applicator wheel having rounded shoulders and a peripheral surface in contact with said side seal means and said doctor blade.

8. The apparatus of claim 7 including:
    inlet means in said pot means for supplying said liquid to the chamber formed by said pot means, said side seal means, said doctor blade, and said applicator wheel surface.

References Cited
UNITED STATES PATENTS

| | | | |
|---|---|---|---|
| 890,221 | 6/1908 | Davidson et al. | 118—261 X |
| 2,328,183 | 8/1943 | Barrett | 118—413 |
| 2,787,244 | 4/1957 | Hickin | 118—259 |
| 2,862,471 | 12/1958 | Sidebotham et al. | 118—259 |
| 2,918,899 | 12/1959 | Munton et al. | 118—259 |
| 3,026,842 | 3/1962 | Faeber | 118—261 |
| 3,032,007 | 5/1962 | McCauliff | 118—259 X |
| 3,192,895 | 7/1965 | Galer | 118—410 X |
| 3,196,832 | 7/1965 | Zin | 118—410 X |

CHARLES A. WILLMUTH, *Primary Examiner.*

L. G. MACHLIN, *Assistant Examiner.*